(12) United States Patent
Hayes

(10) Patent No.: US 7,012,511 B2
(45) Date of Patent: Mar. 14, 2006

(54) LOOSE WHEEL INDICATOR

(75) Inventor: Brian David Hayes, Newark, OH (US)

(73) Assignee: ArvinMeritor Technology, LLC, Troy, MI (US)

( * ) Notice: Subject to any disclaimer, the term of this patent is extended or adjusted under 35 U.S.C. 154(b) by 91 days.

(21) Appl. No.: 10/689,460

(22) Filed: Oct. 20, 2003

(65) Prior Publication Data

US 2005/0083186 A1    Apr. 21, 2005

(51) Int. Cl.
*B60Q 1/00* (2006.01)
(52) U.S. Cl. .................................. 340/438; 340/471
(58) Field of Classification Search .............. 340/438, 340/440, 463, 445, 450.3, 471
See application file for complete search history.

(56) References Cited

U.S. PATENT DOCUMENTS

| | | | |
|---|---|---|---|
| 3,377,710 A * | 4/1968 | Chlopan | 33/517 |
| 4,943,798 A | 7/1990 | Wayne | |
| 4,947,151 A * | 8/1990 | Rosenberger | 340/426.33 |
| 5,070,621 A * | 12/1991 | Butler et al. | 33/517 |
| 5,291,130 A * | 3/1994 | Kendzior | 324/174 |
| 5,552,759 A * | 9/1996 | Stoyka | 340/426.33 |
| 5,823,586 A | 10/1998 | Marley | |
| 5,941,607 A | 8/1999 | Nordine | |
| 5,959,365 A * | 9/1999 | Mantini et al. | 307/10.1 |
| 6,424,261 B1 * | 7/2002 | Williams et al. | 340/568.8 |
| 6,568,696 B1 * | 5/2003 | Osborn et al. | 280/93.5 |
| 6,672,681 B1 * | 1/2004 | Moretti et al. | 301/109 |
| 6,675,640 B1 * | 1/2004 | Ehrlich et al. | 73/118.1 |

\* cited by examiner

*Primary Examiner*—Benjamin C. Lee
*Assistant Examiner*—Son Tang
(74) *Attorney, Agent, or Firm*—Carlson, Gaskey & Olds

(57) ABSTRACT

A loose wheel detection assembly includes a sensor assembly secured to a mounting hub. The sensor detects relative movement between the hub and the wheel and emits a signal indicative of the sensed movement. The signal is received by a controller that processes the received information and alerts a vehicle operator of the relative movement through a warning device within the vehicle cabin.

24 Claims, 5 Drawing Sheets

LOOSE WHEEL INDICATOR

BACKGROUND OF THE INVENTION

This invention generally relates to a safety device for a vehicle wheel indicator, and specifically to a device for detecting relative movement between a wheel hub and a wheel.

In large vehicles and especially a tractor-trailer, it is possible for flat tires and other wheel problems to go unnoticed. Detection of deteriorating wheel conditions is difficult due to the distance between the operator and the wheels of the vehicle. A tractor-trailer typically includes four wheels mounted to each axle. This configuration causes difficulty in detecting tire problems.

Often wheel problems are the result of failure of wheel studs that secure a wheel to the axle. Typically, wheel studs fracture because of improper tightening. An improperly tightened lug nut can cause increased fatigue stresses that can result in premature wheel stud failure. Further, contaminants lodged between the wheel and the hub mounting surface prevent proper seating of the wheel. Improper seating results in improper tightening of the lugnuts. In each instance, the vehicle operator often has little or no warning of a failure.

Improper tightening of wheel studs is recognized as a contributor to premature failure and many devices are available for detecting improper lug nut torque. One such device includes a cover corresponding to each lug nut and press fit onto each lug nut to prevent loosening. Another device includes a pointer that provides a visual indication that a lug nut has rotated away from a properly tightened position. These devices all depend on preventing or detecting rotation of the lug nuts to indicate a wheel loosening condition. However, in some instances, the lug nuts may not loosen before a wheel stud failure. Contaminants between the wheel and the mounting surface may prevent complete and proper seating of the wheel on the hub. Contaminants trapped between the wheel hub and wheel may break away during operation, resulting in a loose wheel. Under these conditions, detection of lug nut position is not a reliable means of detecting a loose wheel condition.

Wheel separation results when wheel studs fail due to stresses caused by relative movement between the hub and the wheel. Movement of the wheel relative to the hub will eventually cause fracture and failure of the mounting studs of the wheel.

Accordingly, it is desirable to develop a method and device for detecting relative motion between a wheel and hub and warn of a loose wheel condition.

SUMMARY OF THE INVENTION

The present invention is a method and device for detecting relative movement between a wheel and a hub to detect a loose wheel condition.

A wheel assembly includes a sensor for detecting relative movement between the hub and the wheel. The sensor emits a signal indicative of movement between the hub and the wheel. A controller receives and processes signals from the sensor and initiates a warning in response to detected conditions indicative of the loose wheel condition. Early detection of movement between the hub and the wheel warns of a loose wheel condition so that corrective action can be taken before failure of the wheel studs.

Accordingly, the method and device of this invention provides an advanced warning of a loose wheel condition by detecting relative motion between the wheel and the hub.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
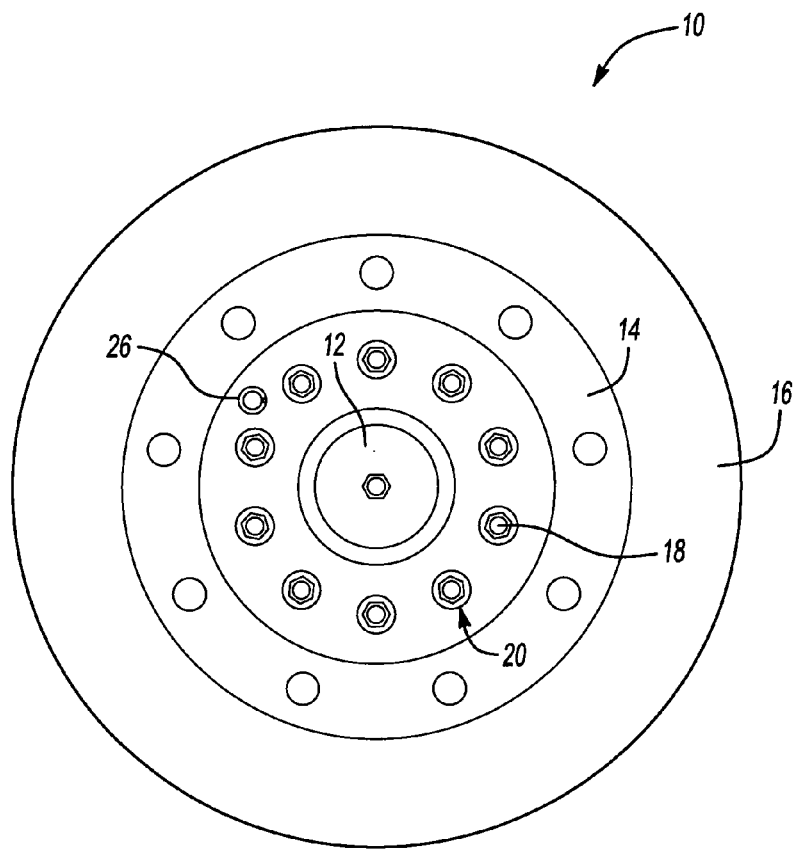
FIG. 1 is a plan view of a truck wheel.
Figure 2:
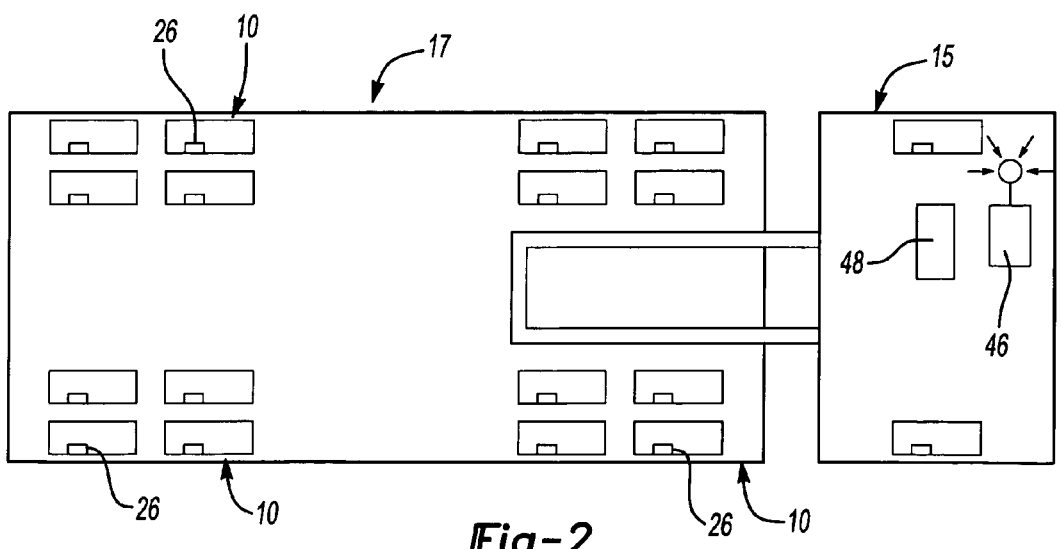
FIG. 2 is a schematic view of a sensor assembly within a heavy vehicle.

Referring to FIGS. 1 and 2, a wheel assembly 10 includes a wheel 14 secured to a hub 12 by multiple lug nuts 20 threaded onto corresponding threaded studs 18. The wheel 14 supports a tire 16 as is known. A sensor assembly 26 mounted to the hub 12 detects relative movement between the hub 12 and the wheel 14. The sensor assembly 26 emits a signal indicative of movement between the hub 12 and the wheel 14. The signal is received by a controller 46 that processes the received information and alerts a vehicle operator through a warning device 48. The warning device may comprise a dashboard light, audible indicator, or any other known indicator. Relative movement between the hub 12 and the wheel 14 indicates a loose wheel condition.

A heavy truck 15, towing a trailer 17 includes a plurality of wheel assemblies 10. Each of the wheel assemblies 10 includes a sensor assembly 26. The sensor assembly 26 continuously monitors relative movement between the hub 12 and the wheel 14. A properly mounted wheel 14 does not move relative to the hub 12. However, conditions such as fretting or improper lug nut torque can cause the wheel 14 to loosen relative to the hub 12. Movement of the wheel 14 relative to the hub 12 can result in failure of the threaded studs 18 used to secure the wheel 14 to the hub 12. Detection of relative movement between the wheel 14 and the hub 12 provides a warning to the vehicle operator of potential failure conditions. Each sensor assembly 26 is identified according to location on the vehicle.

Figure 3:
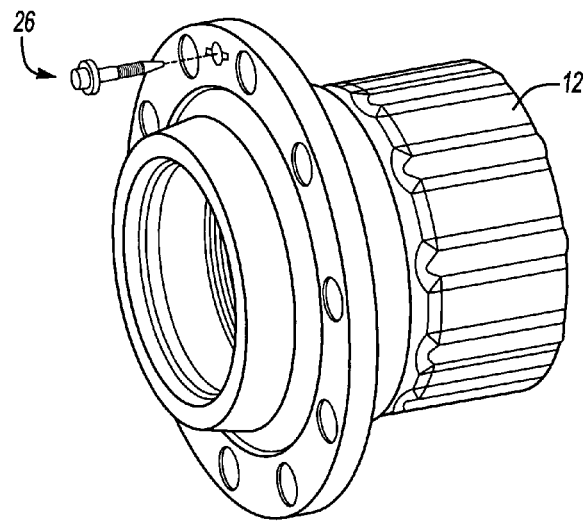
FIG. 3 is a perspective view of a wheel hub.
Figure 4:
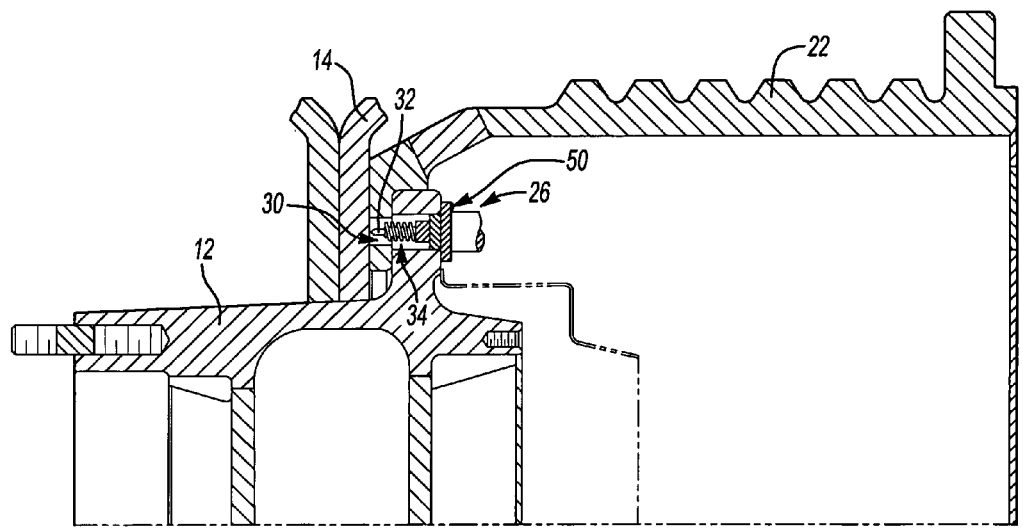
FIG. 4 is a schematic view of the wheel including a sensor.
Figure 5:
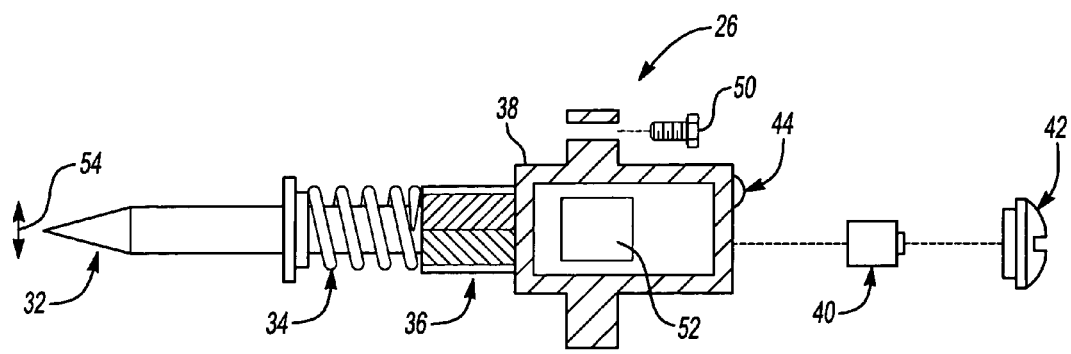
FIG. 5 is a schematic view of a sensor assembly.

Referring to FIGS. 3–5, the wheel assembly 10 includes the wheel 14 secured to the hub 12. The wheel 14 illustrated in FIG. 4 is one of two wheels mounted to the hub 12 in a known configuration common to tractor-trailer and bus vehicle configurations. The sensor assembly 26 is secured to the hub 12 and extends into an opening 30. The sensor assembly 26 includes a pointer 32 contacting a surface of the wheel 14. The pointer 32 engages the wheel 14 to detect motion of the wheel 14 relative to the hub 12. A brake drum 22 mounted to the hub 12 includes a corresponding opening for the sensor assembly 26 so that the pointer 32 can extend entirely through the hub 12 and brake drum 22 to contact the wheel 14. Relative motion between the hub 12 and wheel 14 causes the pointer 32 to deflect from a center position. The sensor assembly 26 includes a biasing member 34 that biases the pointer 32 toward a surface of the hub 12. Deflection of the pointer 32 away from the center position is detected and is indicative of relative motion between the wheel 14 and the hub 12. The sensor assembly 26 is secured to the hub 12 by a retaining screw 50. Other methods and fastening means for securing the sensor assembly 26 to the hub 12 are within the contemplation of this invention.

Figure 6:
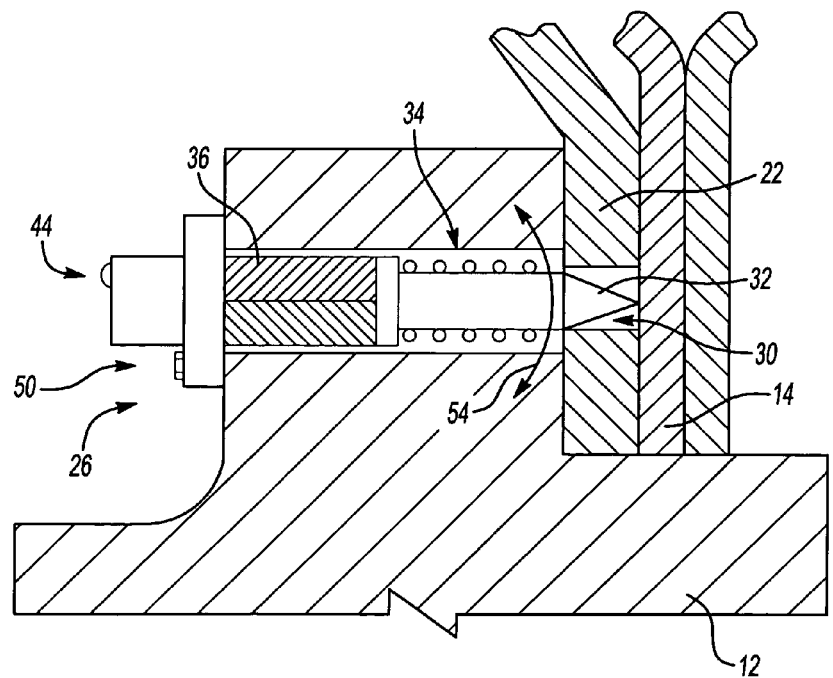
FIG. 6 is a view of the sensor assembly.

Referring to FIGS. 5–6, the sensor assembly 26 comprises a housing 38 containing a piezo-ceramic material 36. The piezo-ceramic material 36 generates an electrical current in proportion to the amount of deflection encountered. The pointer 32 is attached or bonded to the piezo-ceramic material 36 to transfer deflection caused by rotation of the wheel 14 relative to the hub 12 into a proportional electric current. A transmitter 52 disposed within the housing 38 emits a signal relative to the generated electric current. The signal is indicative of relative movement between the wheel 14 and the hub 12.

The transmitter is powered by a battery 40 held in place by a threaded cap 42. A test button 44 activates a test signal from the transmitter 52 to test and confirm operation. Actuation of the test button 44 sends a test signal to the controller to confirm proper operation of the sensor assembly 26. Further, the sensor assembly 26 transmits identification information to the controller 46 to identify the location of the sensor assembly 26 on the vehicle.

Isolated events that may occur during normal operation of the vehicle are filtered by the controller according to a predefined algorithm. In some instance the magnitude of movement between the hub 12 and the wheel 14 may not be indicative of a loose wheel condition. For example, during normal operating conditions the wheel 14 may encounter an extremely rough road condition such as railroad tracks or a pothole that causes an isolated instance of relative movement between the wheel 14 and the hub 12. The algorithm includes predefined parameters that prevent warnings based on isolated instances of wheel movement. Those who have the benefit of this description will be able to select appropriate hardware and suitably program a commercially available microprocessor or controller to execute the algorithm according to application specific needs. Further, the limits required for initiating the algorithm are application specific and a worker skilled in the art with the benefit of this description would be able to select limits based on application specific criteria During operation of a vehicle, the sensor assembly 26, is mounted to contact the wheel 14. Movement of the wheel 14 relative to the hub 12 causes the pointer 32 to deflect as indicated by arrow 54. Deflection of the pointer 32 causes subsequent deflection of the piezo-ceramic material 36. Deflection of the piezo-ceramic material 36 causes the generation of a corresponding amount of electric current. The amount of electric current is proportional to movement of the wheel 14 relative to the hub 12. The transmitter 52 emits a radio frequency signal to the controller 46 disposed within the vehicle. The controller 46 activates the warning device 48 to signal a warning to alert the operator of the loose wheel condition. The signal to the operator can include an identifier to provide a specific location of the detected loose wheel condition.

Figure 7:
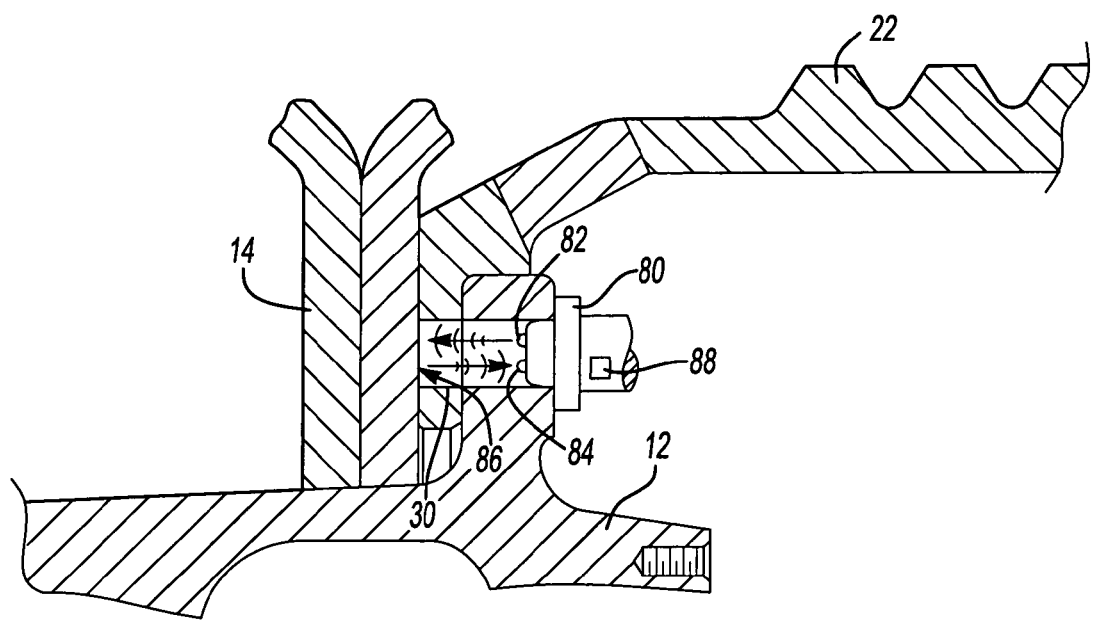
FIG. 7, is a schematic view of another sensor assembly according to this invention.

Referring to FIG. 7, another sensor assembly 80 for detecting movement between the wheel 14 and hub 12 includes a transmitting light emitting diode (LED) 82 and a receiver 84 for detecting relative movement of the wheel 14 relative to the hub 12. The sensor 80 uses light instead of a mechanical contact point to detect relative movement between the wheel 14 and hub 12. The sensor assembly 80 emits a beam of light that is reflects off a surface 86. Light reflected from the surface 86 is received and movement is indicated by the magnitude and duration of light received. The sensor 80 includes a transmitter 88 that transmits a signal indicative of movement between the wheel 14 and hub 12. It is within the contemplation of this invention to utilize known sensors to detect the relative movement between the hub 12 and the wheel 14.

Figure 8:
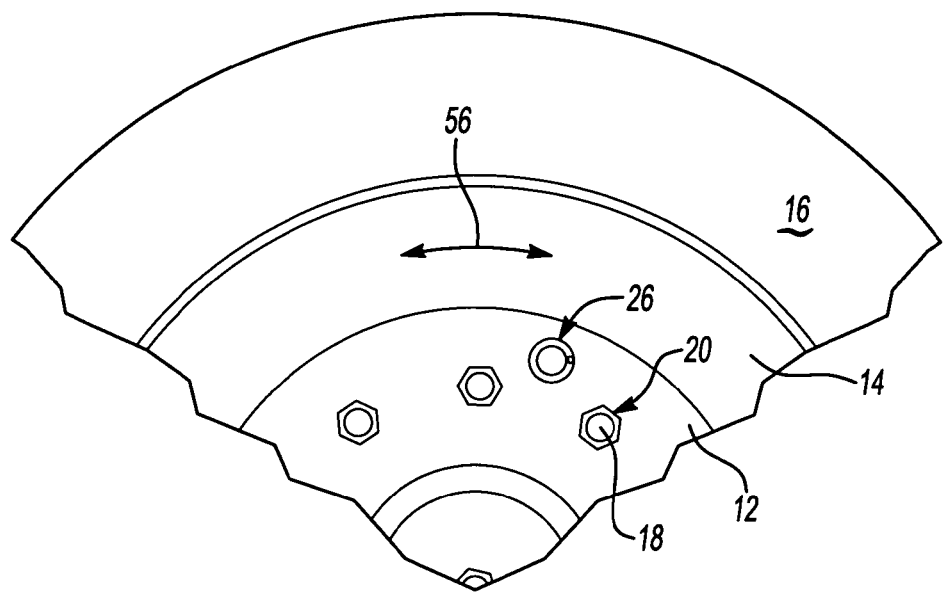
FIG. 8 is a schematic view of relative movement between the wheel and hub.
Figure 9:
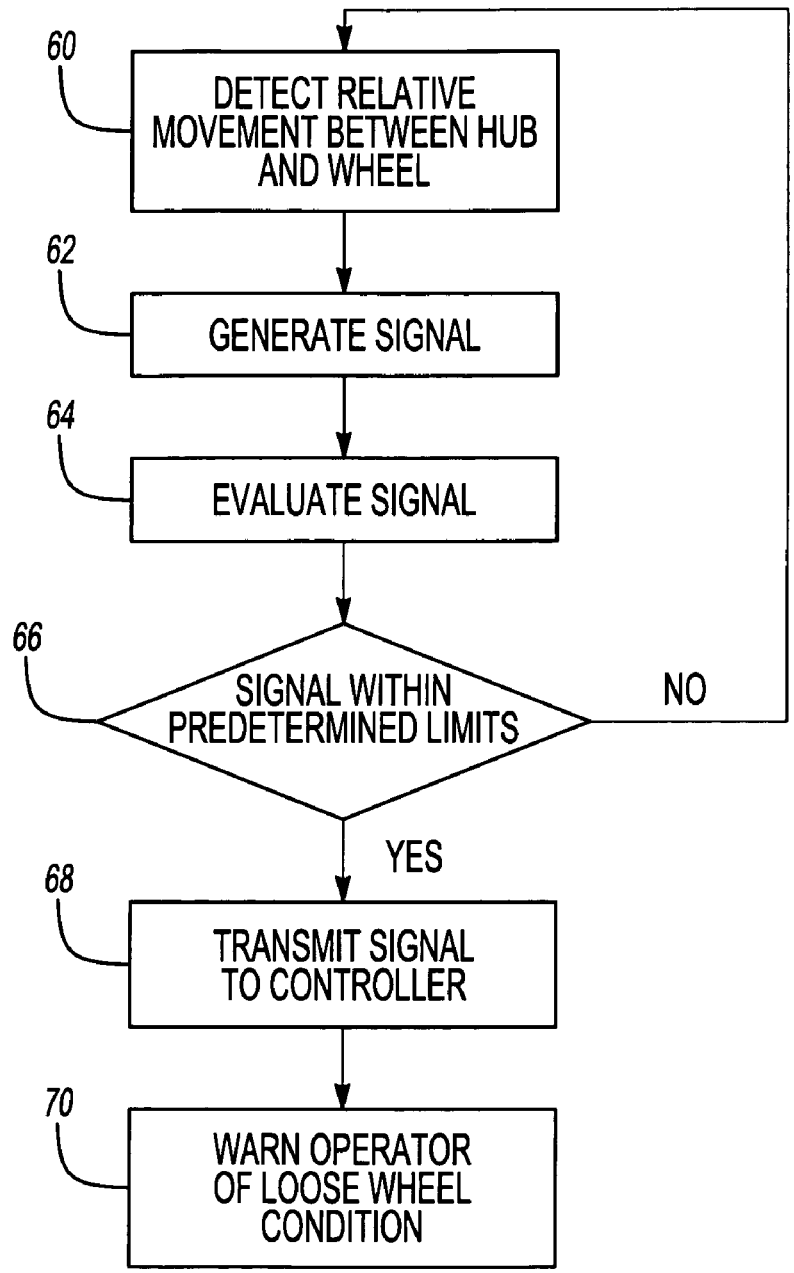
FIG. 9 is a block diagram of a method of detecting a loose wheel condition.

The present invention includes a method of detecting a loose wheel on a motor vehicle. Relative movement between the wheel 14 and hub 12 is schematically illustrated by arrows 56 in FIG. 8. The arrows 56 indicate relative rotational movement of the wheel 14 relative to the hub 12. Referring to FIG. 9, a block diagram of the method includes the initial step of mounting the sensor assembly 26 to detect relative movement between the wheel 14 and the hub 12. The method commences upon detection of relative movement between the wheel 14 and hub 12 as is indicated at 60. The sensor assembly 26,80 generates a signal proportional to movement between the wheel 14 and hub 12 as indicated at 62. Information received from the sensor assembly 26,80 is evaluated, as indicated at 64, according to predetermined criteria and limits set according to application specific parameters. A decision is made as indicated at 66 of whether or not the signal indicative of movement meets criteria established. The limits are determined according to application specific limits such as isolated one-time indications of movement. If the signal is determined to be indicative of a loose wheel condition a signal is transmitted to the controller 46 as indicated at 68. The controller in turn actuates a warning device such as a dashboard light or audible alert as is indicated at 70.

The method and device of the present invention provides a reliable and accurate means of directly detecting a loose wheel 14 by monitoring relative movement between the wheel 14 and the hub 12. The sensor assembly 26,80 includes a transmitter 52,88 that transmits information indicative of relative movement between the hub 12 and the wheel 14 to the controller 46. The controller 46 actuates the warning device 48 to warn the operator of the loose wheel condition.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A wheel assembly comprising:
    a wheel mounted to a hub; and
    a sensor to selectively generate a signal indicative of relative rotation between said wheel and said hub.

2. The assembly as recited in claim 1, further comprising a transmitter and a controller, said transmitter communicating said signal from said sensor to said controller.

3. The assembly as recited in claim 2, further comprising a warning device for conveying information indicative of relative rotation between said wheel and said hub, said warning device in communication with said controller.

4. The assembly as recited in claim 1, wherein said sensor is mounted to said hub.

5. The assembly as recited in claim 4, wherein said hub includes an opening, and said sensor is mounted within said opening.

6. The assembly as recited in claim 1, wherein said sensor further comprises a pointer engaged with said wheel.

7. The assembly as recited in claim 6, wherein said pointer moves in response to relative rotation between said hub and said wheel.

8. The assembly as recited in claim 7, wherein said pointer is attached to a signal generator, movement of said pointer in response to rotation of said wheel actuates said signal generator.

9. The assembly as recited in claim 8, wherein said signal generator comprises a piezo-ceramic material generating an electric current in response to movement of said pointer.

10. The assembly as recited in claim 7, including a biasing member supporting said pointer, said biasing member biasing said pointer toward said hub.

11. The assembly as recited in claim 1, wherein said sensor comprises an optical motion detector.

12. The assembly as recited in claim 11, wherein said sensor comprises a light emitting portion and a light-receiving portion.

13. A loose wheel detection assembly for a wheel mounted to a hub comprising:
    a sensor to selectively generate a signal indicative of relative rotation between the hub and the wheel.

14. The assembly as recited in claim 13, wherein said sensor includes a pointer engaged to the wheel, said pointer movable in response to relative rotation between the wheel and the hub.

15. The assembly as recited in claim 14, further comprising a generator responsive to movement of said pointer.

16. The assembly as recited in claim 15, wherein said generator is a piezo-ceramic member generating an electrical current proportional to movement of said pointer.

17. The assembly as recited in claim 14, wherein said pointer comprises a cylindrical member having an end fixed to said wheel.

18. The assembly as recited in claim 13, further comprising a transmitter for transmitting information indicative of rotation between said wheel and said hub.

19. The assembly as recited in claim 13, wherein said sensor comprises an optical motion detector.

20. A method of detecting a loose wheel on a vehicle, said method comprising the steps of:
    a) detecting relative rotation between a wheel and a hub; and
    b) indicating a loose wheel in response to a predetermined amount of relative rotation between said wheel and hub.

21. The method as recited in claim 20, comprising transmitting information indicative of relative rotation between said hub and said wheel to a controller.

22. The method as recited in claim 20, wherein said step a) comprises contacting said wheel with a pointer and said step b) comprises detecting deflection of said pointer.

23. The method as recited in claim 2, comprising transmitting an electrical signal proportional to deflection of said pointer.

24. The method as recited in claim 20, wherein step a) comprises detecting relative rotation between the wheel and the hub with an optical motion detector.

* * * * *